(12) United States Patent
Schumm, III (10) Patent No.: US 9,034,184 B2
(45) Date of Patent: May 19, 2015

(54) INEXPENSIVE FOURTH WORLD PRIMITIVE WATER CLEANSER WITH KEY PARTS TRANSPORTABLE IN SUITCASE SIZE PACKAGING

(71) Applicant: Brooke Schumm, III, Ellicott City, MD (US)

(72) Inventor: Brooke Schumm, III, Ellicott City, MD (US)

(*) Notice: Subject to any disclaimer, the term of this patent is extended or adjusted under 35 U.S.C. 154(b) by 155 days.

(21) Appl. No.: 13/930,974

(22) Filed: Jun. 28, 2013

(65) Prior Publication Data

US 2013/0313176 A1 Nov. 28, 2013

Related U.S. Application Data

(63) Continuation-in-part of application No. 12/731,127, filed on Mar. 24, 2010, now abandoned.

(60) Provisional application No. 61/162,831, filed on Mar. 24, 2009.

(51) Int. Cl.
*C02F 1/78* (2006.01)
*C02F 1/32* (2006.01)
*C02F 9/00* (2006.01)
*C02F 1/00* (2006.01)

(52) U.S. Cl.
CPC . *C02F 9/005* (2013.01); *C02F 1/32* (2013.01); *C02F 1/78* (2013.01); *C02F 9/00* (2013.01); *C02F 1/001* (2013.01); *C02F 2201/009* (2013.01); *C02F 2201/782* (2013.01)

(58) Field of Classification Search
CPC ............ C01F 1/001; C01F 1/002; C01F 1/32; C01F 1/325; C01F 1/78; C02F 9/00; C02F 9/005; C02F 2201/009; C02F 2201/782
See application file for complete search history.

(56) References Cited

U.S. PATENT DOCUMENTS 6,393,775 B1 * 5/2002 Staschik ...................... 52/79.1
2008/0047907 A1 * 2/2008 Herzog ......................... 210/760

* cited by examiner

*Primary Examiner* — Lucas Stelling
(74) *Attorney, Agent, or Firm* — Brooke Schumm, III; Daneker, McIntire, Schumm, Prince, Manning & Widmann (57) ABSTRACT

This is a scalable water cleansing system intended for very low technology primitive communities buildable for between $600 and $1,000 of parts. A gravity feed system is contemplated with one or more of an initial filtering stage(s), a settling stage, a UV treatment stage, and an ozonator stage. A stand-alone power system with solar power needing no infrastructure is contemplated to enhance purification. The system can improve the worst of water quality, including for small groups; and under some conditions to end up with clean water of a quality found in developed countries with mature water systems.

For water to the site in communities with low precipitation, the water brought in would be emptied into the initial stage of the water cleansing system, and the person who brought the water would draw from the last stage most or all of the amount of water carried in.

6 Claims, 8 Drawing Sheets

CROSS SECTION OF SOLAR INSOLATED UV WATER CLEANER

FIG. 7

ROTATING DESSICATOR

FIG. 8

INEXPENSIVE FOURTH WORLD PRIMITIVE WATER CLEANSER WITH KEY PARTS TRANSPORTABLE IN SUITCASE SIZE PACKAGING

PRIORITY DATA

This application claims benefit and priority of U.S. Provisional 61/162,831 of the same title filed on Mar. 24, 2009, which is adopted by reference and claims benefit and priority of pending U.S. application Ser. No. 12/731,127 which is adopted by reference.

FIELD OF INVENTION

This is a water cleansing system intended for very low technology primitive communities. A gravity feed system is contemplated with an initial filtering stage(s), a settling stage, a UV treatment stage, and an ozonator stage. The system is enhanced by filters and a stand-alone power system with solar power needing no infrastructure to operate simple but powerful cleaners in the form of UV cleaners and an ozonator. The objective is to improve water quality from the worst of conditions; and under some conditions to end up with clean water of a quality found in developed countries with mature water systems.

SUMMARY OF INVENTION

The overarching principle of the system is gravity feed system with an initial filtering stage(s), a settling stage, and one of a UV treatment stage, and an ozonator stage. Other filtering is useful and a stand-alone power system with solar power needing no infrastructure is contemplated to enhance purification. The objective is to improve water quality; and under some conditions to end up with clean water of a quality found in developed countries with mature water systems.

The general principle is that if water had to be carried to the site in communities with low precipitation, the water brought in would be emptied into the initial stage of the water cleansing system, and the person who brought the water would draw from the last stage an equal amount or high percentage of the amount of water carried in. A responsible community person, with little education, who happened to be getting their water, could scrape any build-up of filtrate, and rotate the desiccator as needed.

The system is fully scalable in size, but one key is that it can serve at a very inexpensive cost, a small group of people. If the constraint is the ozonator, it supposedly processes, according to its specifications, 1 ton of water per hour or about 250 gallons per hour. A typical person can live on about 5 gallons of water per day on a subsistence basis, assuming no flush sanitation, so a small village could be supported by the system. If the sand filter is the constraint, the system would be restricted to supporting perhaps 4 or 5 five person families. The system is useable even for contaminated wells, which at least have the advantage of not needing a pre-filtering step.

Depending on the climate, one will pick and choose among several options for each stage, largely depending on the amount of precipitation, temperature, and sunlight.

BACKGROUND AND GENERAL DESCRIPTION

To begin with a further introduction, a quotation from Technology Notes, published by WaterAid, a registered UK charity, 47-49 Durham St., London, England SE11 5JD (referred to as WaterAid Technology notes) gives a good background:

"Wherever possible, a water source that is chosen for development should be one which does not require treatment in order to give a satisfactory quality of water. A source which is relatively expensive to develop can often be more economical in the long-run than a source which is cheaper to develop but which requires daily maintenance—or even if it requires maintenance only weekly.

A community water supply scheme must be within the capacity, both financial and technical, of the benefiting community to operate and maintain it. It is more likely to be sustainable if the emphasis of the project is on the protection of the sources of water so as to maintain safe water quality rather than on the treatment of polluted water. Sometimes it is necessary to develop a source for purposes other than drinking, such as bathing or clothes washing, where a reasonable supply quality is needed to combat "water washed" diseases.

Ground water from wells or springs is usually of an acceptable quality, due to natural filtration through the ground. However, water from surface sources such as streams, lakes and ponds will usually require some form of treatment. The quality of this water may vary greatly with the seasons of the year. The treatment of surface water can be an expensive exercise and one which it is difficult for communities to sustain without long-term external support. Routine maintenance is essential and, in addition, an ability to vary the method of treatment so as to respond to changes in water quality is required. The ultimate water treatment, namely, using chemicals, is not considered viable in sustainable community development.

Three simple methods of treatment are considered viable: settlement, roughing filtration and slow sand filtration. Either of the first two will improve the appearance of the water but the third, particularly when used with one of the first two, should give a clear and bacteriologically pure water."

Water Aid Technology Notes at p. 44.

The purpose of this invention is to attempt to utilize more modern no-maintenance technology to achieve cleaner water.

As initially stated, and as WaterAid emphasizes, it is always easier to clean already mostly or completely clean water, but the realities of the $3^{rd}$ and $4^{th}$ world are that surface water is a common and the only viable source for the truly impoverished because it is free. So, the objective has to be to improve the only source and reduced disease and problems from water borne contamination.

Another harsh reality is that absent a complex and large organization, it is very difficult to find money or even ship the parts to accomplish a sustainable water-cleansing system. Theft, and the necessity for non-hand-carried luggage to be guarded and secured is a persistent problem in third world countries. Thus, this design can be dissembled and carried in one or two suitcases. Once built, no one is likely to steal the box of sand which is the filter, but security for the solar panel, battery and converter, even in this simple system, is an issue which a local community would have to address. The UV treatment stage is otherwise useless to a thief absent the integrated system, so it too is less of a theft problem.

As to maintenance, most of the WaterAid systems need some maintenance, perhaps every day or two by someone with some understanding or skill. There are many communities where that is just not realistic.

For example, posit the following observation from WaterAid's Technology Notes:

"The cost of operating the project when it is finished must be considered at an early stage. This may be little more than the cost of payment for the occasional services of a caretaker to clean the apron and steps at a protected spring, handpump or borehole. However, it might be considerably more, such as the cost of maintenance, and possible replacement of parts, for a handpump, or the operation of a diesel driven pump, including the provision of fuel or even the provision and dosing of chemicals for water treatment.

The following list of headings to be considered was used in the preparation of a maintenance budget for self sufficiency for a gravity scheme, from a spring source, supplying 50,000 people in rural Ethiopia.

Salaries
   Office staff
   Caretakers
Maintenance cost
   Labour costs
   Materials for repairs
Office costs
   Maintenance—structure and equipment
   Stationery and printing
Transport cost
   Truck hire to carry out repairs
   Caretakers attending the office
Protective clothing
Hand tools
Meter replacements
Consultants—(to advise on management and engineering)
Training
Motor bikes
   Replacement costs
   Running cost
Two other items to consider (not applicable in this particular example project) are diesel and electricity."

Water Aid Technology Notes at p. 5.

While of course the needs are great, and a system for 50,000 people is commendable, much of the world lives in poor subsistence communities that have no possibility of any of the above. The only items these communities have some access to is sunlight and surface water. There is no money for "cost of operating." More likely is that a partner of an international aid organization will have an employee who circulates from site to site to check them out, identify needs, perform testing if needed, and make a major repair, which in the case of this system, is basically a modular re-insert.

This invention proposes a sustainable solar powered water-cleansing system that is not necessarily perfect, but can be carried in a suitcase on a plane and will considerably improve and perhaps purify water. The objective was to build a system for $500 of materials purchased commercially in U.S. internet and local hardware distribution stores. That objective is likely not attainable at current 2009 prices absent shipping discounts; however, $600 seems doable for raw materials, without the battery, lumber, or labor involved. The concept is that the labor would be obtained overseas. Shipping batteries overseas, especially the cheapest and most practical battery, a lead acid battery, is not realistic, but lead acid car batteries are fairly ubiquitous and can be obtained in every country in the world, and even in fairly remote locations. There are batteries available in which the battery is dry, and the electrolyte is unmixed. The electrolyte can be mixed with clean water and then put in the battery. A hygrometer is needed to initially calibrate the battery. Dirt, sand and gravel for filtering would be procured near the community site where the water cleansing device is erected.

OBJECTIVES OF THE INVENTION

To build a sustainable system requiring little maintenance except hand-cleaning and hand-scraping/shoveling of build-up, or alternatively, washout with water.

To build a system for well under $1,000 in U.S. raw material prices, preferably about USD500.

To utilize the resource of what is often present most in the poorest areas with the poorest water supplies: the sun. The sun generates, free of charge, low level power and high level ultraviolet radiation.

To create a solar-powered system which uses ozonation for final cleansing and UV radiation for cleansing prior to that stage.

DESCRIPTION OF FIGURES

FIG. 1 shows a proposed structure from the WaterAid Technology Notes. The key parts are an inlet, a drain to empty out the bottom, and a board to keep scum in and then a weir that water falls over to an outlet drain to the next phase of the system. If the height of the settling and filter pond is distance "d," the inlet is ¼ d from the top, the surface of the weir on the outlet side is ⅛ of d. This is an elongated settling pond with a one meter deeper area before a long tank leads from the inlet to the weir and outlet drain.

a. "The open tank should be about three meters deep.
b. The filter media is one meter deep with clean sand of one size, between 0.15 mm and 0.35 mm.
c. The filter media is supported on gravel, varying between 2 mm and 10 mm.
d. An underfloor drainage system is required, which is constructed of bricks, blocks or pre-cast slabs.
e. The baffled inlet should be about one meter above the sand.
f. The outlet flow needs to be controlled by a weir and outlet valve."

FIG. 8 shows a rotating dessicator for connection to the ozonator. The tube in penetrates the horizontal board and meets a seal, not shown, coincident with an aperture in the glass cover of the dessicator and air exists through a sealed tube carrying air to the ozonator. The air intake is shown on the bottom.

DESCRIPTION OF THE INVENTION

Four general stages are contemplated, filtration and settlement, potential heating, UV treatment, and ozonation.

Depending on the source, it will often be useful to test the water. There are kits ranging from inexpensive kits that take a few days to detect bacteria, but detect chemical contaminants quickly to very sophisticated kits. Some water will be so bad but likely not contaminated with chemicals that testing of the raw water is not particularly informative other than as a baseline. For some well-water though, it is important to know if trace chemicals such as arsenic are present.

Again referring to the Technology Notes of Water Aid quoted earlier, the following description is useful:

"Settlement

The quality of water from streams etc can often be significantly improved by the removal of suspended matter by simple settlement. Most suspended particles are heavier than water (although a few may float) and will settle in quiescent conditions; very fine clay particles may not settle out at all. Most structures that hold water will function as a settlement basin. Natural or manmade ponds or lakes will suffice, but purpose-made structures which incorporate efficient inlet and outlet arrangements and facilities for silt removal are generally more effective.

A layout of such a settlement tank is shown below. The length is usually about three times the width, and a practical depth is about 2 meters. A capacity of two to four hours retention at maximum flow should be sufficient to remove most sand and silt.

On small installations it may be better to fill the basin with stone or gravel to prevent the incoming flow from disturbing the settled solids. The sediment can then be washed out with a hose pipe."

Water Aid Technology at p. 44.

Figure 1:
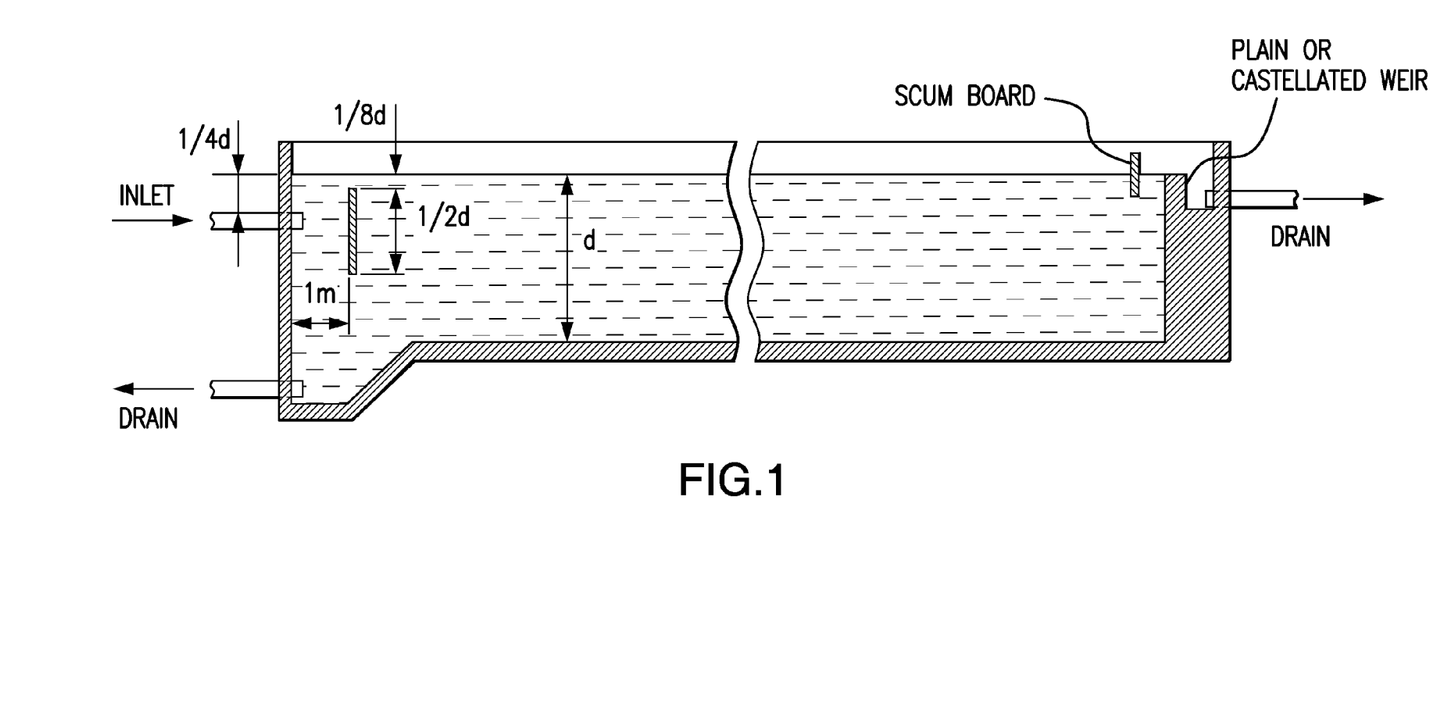

A proposed structure from the WaterAid Technology Notes is shown as FIG. 1.

Roughing filters and sand filters are described in the WaterAid Technology Notes as follows:

"Roughing filters

A settlement tank for small flows, as described above, is, in fact, a roughing filter. However roughing filters are usually vertical flow filters where the sediment is deposited on the filter media as the water flows down through it. This filter media can vary in size but 4 mm to 20 mm is the range to be considered, depending on the sediment to be removed. The filter media can be cleaned by washing it down, or by backwashing under pressure, with a supply of clean water. The ultimate roughing filter is a rapid gravity filter with sand 1 mm to 4 mm as the filtering media. Such a filter needs careful design and must have the facility for backwashing under pressure with water at a high rate of flow. The filter rate for this type of filter is usually about 5 meters per hour, but this can safely be exceeded in many situations.

Slow sand filters

Slow sand filters function by forming a film of bacteria and algae on the surface of the sand as the water passes through it. The rate of flow must be controlled to 2.5 cubic meters per square meter per day, or a vertical flow rate of 0.1 meters per hour, and the filter must be cleaned periodically as the flow rate drops, by removing a skim of sand (20 mm). The incoming water must be of a reasonable quality, or must receive pre-treatment, to prevent the slow sand filter from blocking too quickly. It is usually necessary to have two units in parallel, so that some supply can be maintained when one unit is out of commission for cleaning.

Figure 2:
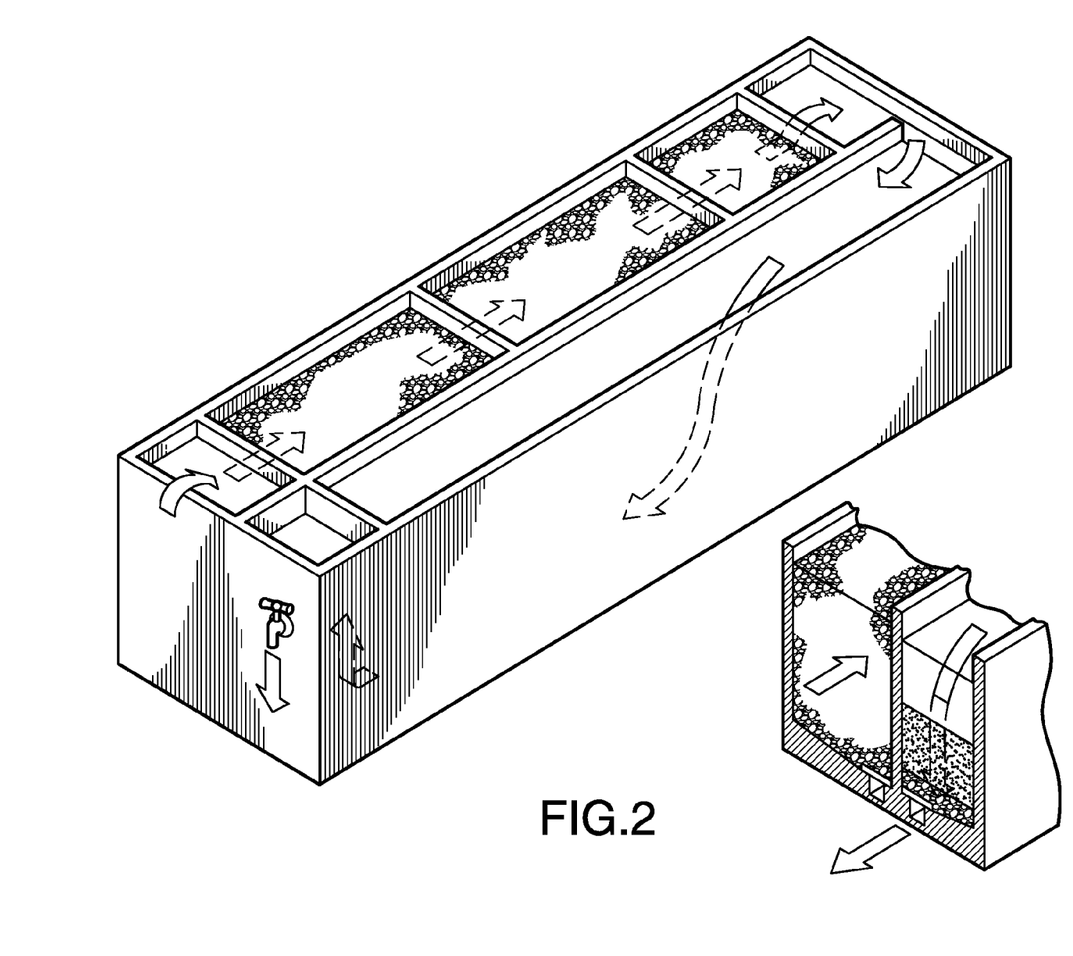
FIG. 2 shows another elongated tank with water flows through it and is described as having the following characteristics.

A typical layout is shown in the diagram below [FIG. 2] but the following factors should be borne in mind:

g. The open tank should be about three meters deep.

h. The filter media is one meter deep with clean sand of one size, between 0.15 mm and 0.35 mm.

i. The filter media is supported on gravel, varying between 2 mm and 10 mm.

j. An underfloor drainage system is required, which is constructed of bricks, blocks or pre-cast slabs.

k. The baffled inlet should be about one meter above the sand.

l. The outlet flow needs to be controlled by a weir and outlet valve."

WaterAid Technology at p. 45.

Unfortunately the proposed WaterAid technology is too aggressive and expensive a solution for most poor communities. Ever the idea that there is water to spare for a washout as discussed in the WaterAid Technology Notes on "Settlement" is not a likely scenario in "fourth world communities." These are communities which are not subsistence communities. They are less-than-subsistence communities; they are what can be called "fourth world" communities and villages described as follows: their members are constantly dying and only surviving as a community population because barely enough, but just enough, families have multiple children who are born and some of whom survive to reproductive age (many or most die before reproductive age). Life expectancy even upon adulthood is low and the reproductive years often short. Even as an adult, the likelihood is high of succumbing to pregnancy, water-borne illness, or to disease or ordinary natural illness as a result of poor diet, inadequate caloric intake and weakened immune systems. Medical care is non-existent; in fact the best medical care that could be quickly provided would be a source of cleaner water. The community just barely sustains its population, and likely fails in the event of epidemic, famine, or war.

The proposed design is intended to be incredibly primitive and cheap. It can be integrated at any logical point with a more in-depth higher volume system if community aid becomes available or if productivity enhancements in a local community permit the improvement of a particular stage. It can be scaled. An organized population can charge for the water to have better maintenance and expand its capabilities, but at its most basic level, the uneducated users can provide short-term maintenance of the system and the pay is carrying the water to the location of the water cleansing system.

As to materials, blocks and bricks and valves are not likely to be available, or will be too costly. A rubber shower mat and pure gravity system with only one valve on the end are proposed.

Stage 1: The Macro/Rough Water Filter and Gatherer

A) Rain or snow preferred gathered in clean fashion, including via gutter system pre-filtering optional if water is generally uncontaminated. WaterAid Technology Notes has a fine guide to this methodology.

B) Where falling precipitation not available, and surface water will be used, water needs to be pre-filtered.

C) In some places, the problem is that a well is contaminated. The system is designed to be used with well water being manually deposited or pumped into it, subject to volume constraints. A well may have the advantage of at least producing apparently clear water, which is considerably easier to treat, and may allow the elimination of the first stage rough filter.

The proposal is to build a sedimentation pond or box or jar for settling out dirt and solid contaminants. The pond could be lined with a rubber shower 40 mil (0.1 cm.) liner which can be cut and shaped and a drain put in the bottom sealed with caulk and a rubber gasket. This can be cleaned by hand as it fills up. This filter should be screened from insects and animals to avoid insect and animal contamination. The top would be screened, like self-cleaning hardware mesh (tilted), then fine screen (tilted), then sand, clay and gravel filter. Water would be caught so it did not run off the tilted screen. An outlet would be created from near the surface of the sedimentation pond or jar. In climates where there is potential high evaporative loss, a plastic cover to drip evaporation back into the sedimentation pond would be useful. A person using water would pour their water into the intake. The objective is to clean up "macro" contamination (feces, dirt lumps and other coarse contaminants) before a finer filtering occurs. The Water Aid filters propose that water appear to enter at the top of the roughing filter and in a sense there be a sideways filtering. If the sedimentation pond or roughing filter can have gravel that can be changed periodically, then actually, the principle shown in FIG. 3 of having water be poured into a pipe to enter at the bottom of the roughing filter and be drained off from the top appears to be preferable.

From the outlet of that sedimentation pond or jar, water would be run by a fairly large tube or pipe to the next stage.

Stage 2. Finer Biofiltering

A combination clay, soil and gravel filter would be created. These would preferably be layered from coarsest at the bottom to finest with a removable fine layer on top. The top fine layer functions as a biofilter where fermentation and degradation of bacteria could occur and could be exchanged as needed. This stage would further filter solid contaminants, and also act as a partial purifier and biofilter. Recognizing the need to avoid insect and animal contamination, this would be preferably with a self cleaning screen with a course hardware mesh partially tilted and a finer screen. Water would be caught so it did not run off the titled screen. A good example of a preferred mode is a modification of WaterAid filter. Generally, the deeper the sand filter, the better, but the thicker the filter, the slower the flow. For initial purposes, I would propose a four foot by four foot box with a lining of rubber shower bottom. Caulk would be used to minimize leaks. The shower bottom material is made in five foot widths and would need to be overlapped. The box should have at least 1 m thick of fine material and have a drain and gravel to slow infiltration of solid material into the drain.

The WaterAid analysis stated: "The rate of flow must be controlled to 2.5 cubic meters per square meter per day, or a vertical flow rate of 0.1 meters per hour, and the filter must be cleaned periodically as the flow rate drops, by removing a skim of sand (20 mm)."

The quantity of 2.5 cubic meters per square meter per day is a quantity of 2500 liters (1 cubic meter equals 1000 liters). One liter weighs approximately one kilogram. Thus, 2500 liters is approximately 5500 English pounds. The ozonator being contemplated purportedly can process 1 ton of water per hour or 24 tons of water per day. That is a lot of water for a small machine and has yet to be tested. Nonetheless, if true, a surface area to process 24 tons (48,000 pounds) of water per day would have to be one or a number of sand filters, according to WaterAid, of approximately 48000 lbs. per day divided by 5500 lbs. per square meter per day, or approximately 8.7 square meters.

This suggests that the constraint in the system will likely be the sand filter, and the rest of the system would be designed proportionately around the size of the sand filter.

The filter is lined with a rubber shower bottom. Without the valves, though PVC valves are not particularly expensive, and are fairly reliable if not overused, the system would have a tube running from the roughing filter to the bottom of the rubber shower bottom where water is forced upward through the gravel and sand to the surface and decanted off near the top surface. That tube would run to a settlement jar or the next stage. Brass would be better, but then copper piping is preferable, and the more cost in the system, the more valuable it is to thieves.

One of the best ways to remove fine clay suspensions is to add alum, but given the primitive intent of the system, for now, that is only a suggestion for a settlement jar, but would require periodic maintenance and circulation.

Based on the WaterAid technology notes, assuming the surface of the sand filter is periodically replaced and the sand is sufficiently fine, the water should be fairly pure. This remains to be tested. A section through a WaterAid sand filter design is shown in FIG. 3 to illustrate the principles.

Figure 3:
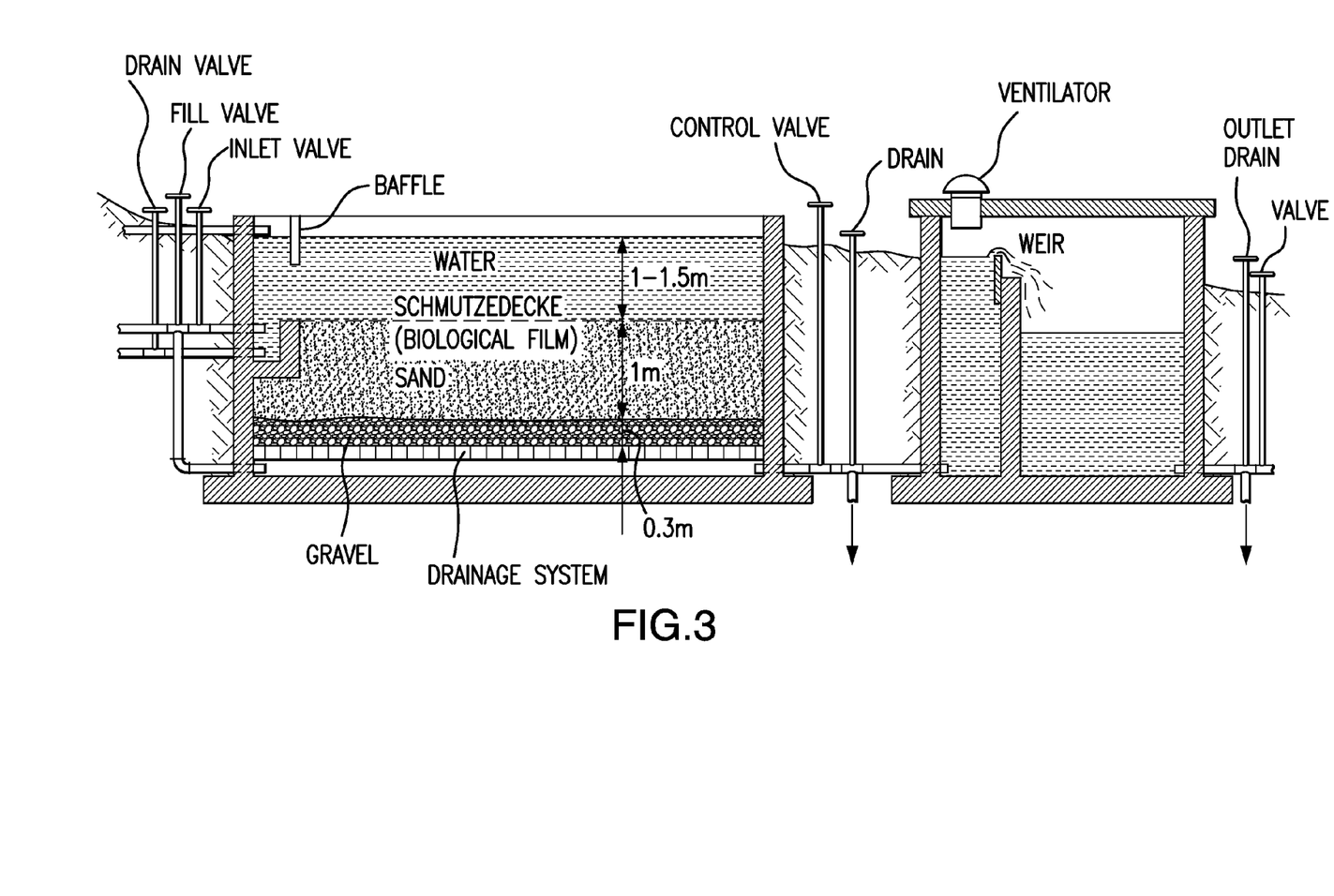
FIG. 3 shows a more complex system whose principles are applicable to this invention with many more valves, but in essence showing the concept of water coming in an inlet near but under a surface of water with a biological film on top, and water flowing down sand and gravel to a lower level and thence to a second tank where it washes over a weir and then water is taken out of the bottom of the second tank. This is a simple and easy to build system, and does not need as many details as shown in FIG. 3.

FIG. 3 is more complicated than this invention proposes because of the valves and some other items, though all are good ideas. This invention would not have the valves. Thus far, then the invention proposes that after the roughing filter, the water would go through a sand, dirt and gravel filter (covered by screening to keep bugs and foreign material out and be drained preferably to a second settling stage).

An advantage of loading the water through the bottom of the fine filter is that little gravity pressure is lost in the filtering stage and water can flow from the upper areas of this filter to the subsequent stages placed at a level lower than this filter to take advantage of gravity.

The next phase for cleansing and filtration is for use in wood-burning cultures where wood is available. This phase is a charcoal filter. It uses wood that has been chopped and cooked and heated thoroughly. Such heating and cooking creates an activated charcoal of sorts. Simply run the water in the jar and replace the charcoal from time to time.

WaterAid proposes a weir over which the cleaner water flows into a vented storage tank, but many villages have no ability to build a proper storage tank and this invention does not require that.

As stated, the water then proceeds to the next stage, likely another settling jar and/or then to a potential heating step and then through a tube continuously to later components and stages.

For use with the UV purifier powered by solar power, the performance is greatly enhanced by filtering the water further down to 5 microns. The preferred mode for filters is to use filters that fit in housings connected by tubing into which the water being cleansed flows. Before entering the fine filter system next described, sediment can be further removed by spindown filters, with or without screen mesh. Part No. ¾-100-f by Rusco Corporation, 13360 Chambord St., Brooksville, Fla. 34613 is a good source. These spin down filters, mounted vertically so the bottom drain points downward, are easy to wash out with minimal water loss as the sediment collects at the bottom.

Filter housings vary in price, but the optimal system is one that uses filters that are inexpensively available and can be washed with common soap or disinfectant and reused, and are shippable and/or portable in suitcases from developed countries. The most common size appears to be "10 inch" filters and their compatible housings.

The filters and plastic parts should be disposed and arranged to be shaded from the sun to prevent the plastic from deteriorating from sunlight.

Stage 3: Potential Heating Step

This is an optional though desirable stage in hot climates with plenty of sun. Heat is the enemy of all virus and most bacteria, particularly at any level above 140 degrees F. or 60 degrees C. In many third world countries, there are oil drums available. The design proposes that where available, the water should run into a sealed drum painted black, which drum will need a pressure release valve, and simply let the sun do the heating.

The heating can be enhanced by seating the drum symmetrically within a cardioid shape formed on a wood frame with the discontinuity point of the cardioid underneath the drum. The cardioid looks like a Valentine heart with a rounded bottom turned upside down. Thus the cardioid is placed on the x and y axis, with the x axis parallel to the parallel to the bottom of a tangent to a circular object being heated such that where the side of the cardioid is parallel to the y axis, that is vertical, the sides simply are continued vertically. At those vertical points, the sides are to be approximately twice as wide as the drum. The general equation of a cardioid is that the radius r equals one plus a simple sinusoidal function. For this design, with the x axis parallel to the bottom of the tangent to a drum, the preferred equation is $r=1+\cos\theta$. The principle of the drawing of a cardioid is the trace of a point on a circle rotated on another circle. By placing a multiplier on the preferred equation, a shape of an epicycloid which is more useful to match the constraints of the container for the reflector and object being heated can be designed. Basically, it is most desirable to have the container for the reflector and width of the reflector be twice as wide as the cylinder or cylindrical area being heated.

The effect of using the cardioid is that the rear of the drum is also heated by sunlight. The cardioid's interior, toward the drum would be coated with a reflective material. The cheapest reflective material is aluminum foil, but aluminum flashing would be sturdier when nailed on a wood frame, and less framing would be needed.

Stage 4—UV Treatment and Intensifier

A tube, preferably running longitudinally in several loops in a sort of cylindrical cardioid shape with cardioid mirrored surface (flashing or aluminum foil) focuses intense sunlight on water to do ultraviolet (UV) killing and heat the water to trigger more chain-breaking reactions and bacterial destruction. The turns and loops also mix the water.

A solar still and condenser can be used for assistance in hotter climates

For pressure relief and to prevent vapor lock, and to solve a problem related to the UV exposure device is to deal with problems related to possible conversion of water into steam, the invention proposes that the UV exposure tube be vented in the following manner:

A tube would lead from the tube exposed to sunlight in the UV intensifier to a condensing apparatus. The condensing apparatus would be situated above the highest liquid level in the apparatus (above the top of the water filter and gatherer) to avoid suction of contaminated water into the condensing apparatus. There are other means to achieve this, but situating the condensing apparatus at the high point is the cheapest. The end of the tube with a sealed entry into a condensing tank would be curved downward inside the condensing tank which would be filled with clean sterile water. The upper part of the tank would have a drain into the outlet of the UV exposure device. As steam is generated, if any, in the UV intensifier, it rises by convection or expansion and condenses, raising the condenser water level until it drains what is now distilled water into the main system. The tank would have a vent covered by a material through which vapor can pass such as Gore-Tex® or Supplex® fiber or Dupont Tyvek® vapor barrier. If the vapor condenses in the tube before reaching the condenser, it will dribble back into the UV intensifier and be mixed with the liquid in the UV intensifier.

The UV intensification could be enhanced by using a magnifying lens or by shaping or drawing the glass to have the tube function as a lens.

Another enhancement to the UV exposure stage would be to design a recirculating pump to mix the water and enhance UV exposure. This would use a principle similar to a Hero's fountain. A very low wattage is needed to pump water up a tube to the top of a tank to be dropped back into the same tank. A low wattage pump could be used in parallel with the later-described ozonator. The difference in potential energy is not from the top to the bottom of the tank, but rather from the surface of the top of the water in the tank to the height of the outlet of the tube from the pump. By drizzling the water back into the tank, the water is oxygenated, and freshened in taste, and the oxygenation and UV exposure both purify the water.

The same enhancement of a fountain internal to the drum can be done to the oil drum if it is used.

The pump can be operated by a solar panel or with the solar panel referred to in conjunction with the ozonator stage.

The preferred, but not essential next phase is that water sits in clear glass bottle in sunlight—will cool water some from the solar still and condenser.

Note that if the WaterAid claims are true about its filtering system, that system could simply be combined with the UV treatment and ozonation described herein yielding high quality drinking water.

In addition to the design for an ultraviolet cleaner described, it turns out an aquarium UV cleaner has fairly high throughput and is available at low wattage (about 35 watts) and is small (about 5 cm. diameter by 50 cm. long thus fitting in a suitcase). The UV purification system selected was from Freshwater Systems, Inc., 85 Commerce Center, Greenville, S.C. 29615. There are UV purification systems available which are adaptable to 12V applications. Twelve volts has the advantage with all the water around of virtually eliminating the risk of electrocution. A Sterilight® 6 gallons per minute Model S5Q-PA (12 VDC) is a good selection. It is preferable to filter input water down to 5 microns.

A solar panel of about 2 feet by 2 feet, thus fitting in a suitcase can generate about 50 watts and power this UV cleaner and the ozonator. Careful power management would be needed if the electrical generation and storage system is to be used at night, but careful use could enable LED lighting in small amounts in the evening and the drawing of clean water after the sun set. Charging of a small wattage cell phone or computer could occur. For small increments, chargers are available that generate 110V for approximately USD 50-USD65 which can be used to charge rechargeable devices such as power tools which could significantly increase productivity in remote places.

The UV treatment stage is optional if the ozonator is used, but is preferable to the ozonator if only one of either UV treatment, or ozonation is used.

Stage 5—Cooling and Ozonation

The rest of system is sealed vacuum drawn and gravity driven when water is pulled/drained through the tap.

Figure 4:
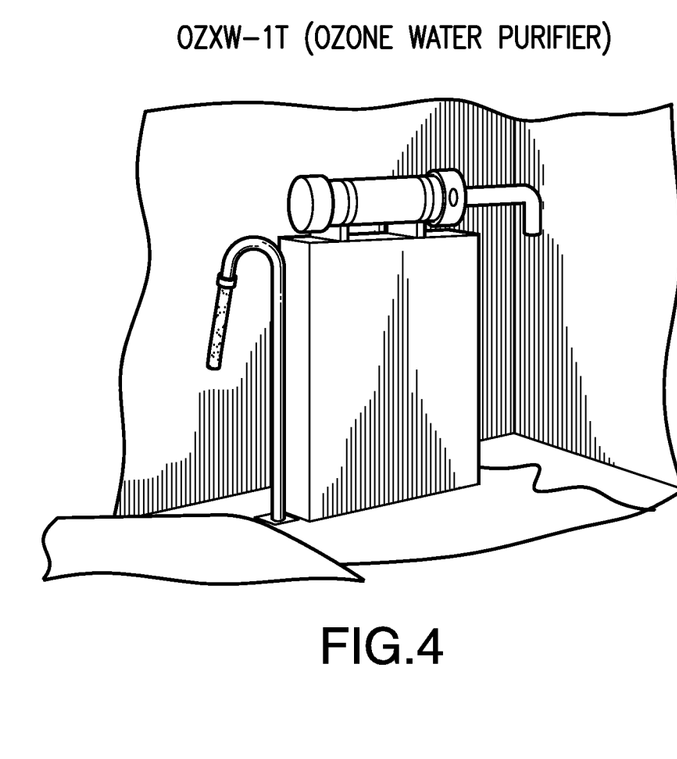
FIG. 4 is a line drawing of the ozonator water purifier or ozonator cleaner. The line drawing shows a OZXW-1T (Ozone Water Purifier).
Figure 5:
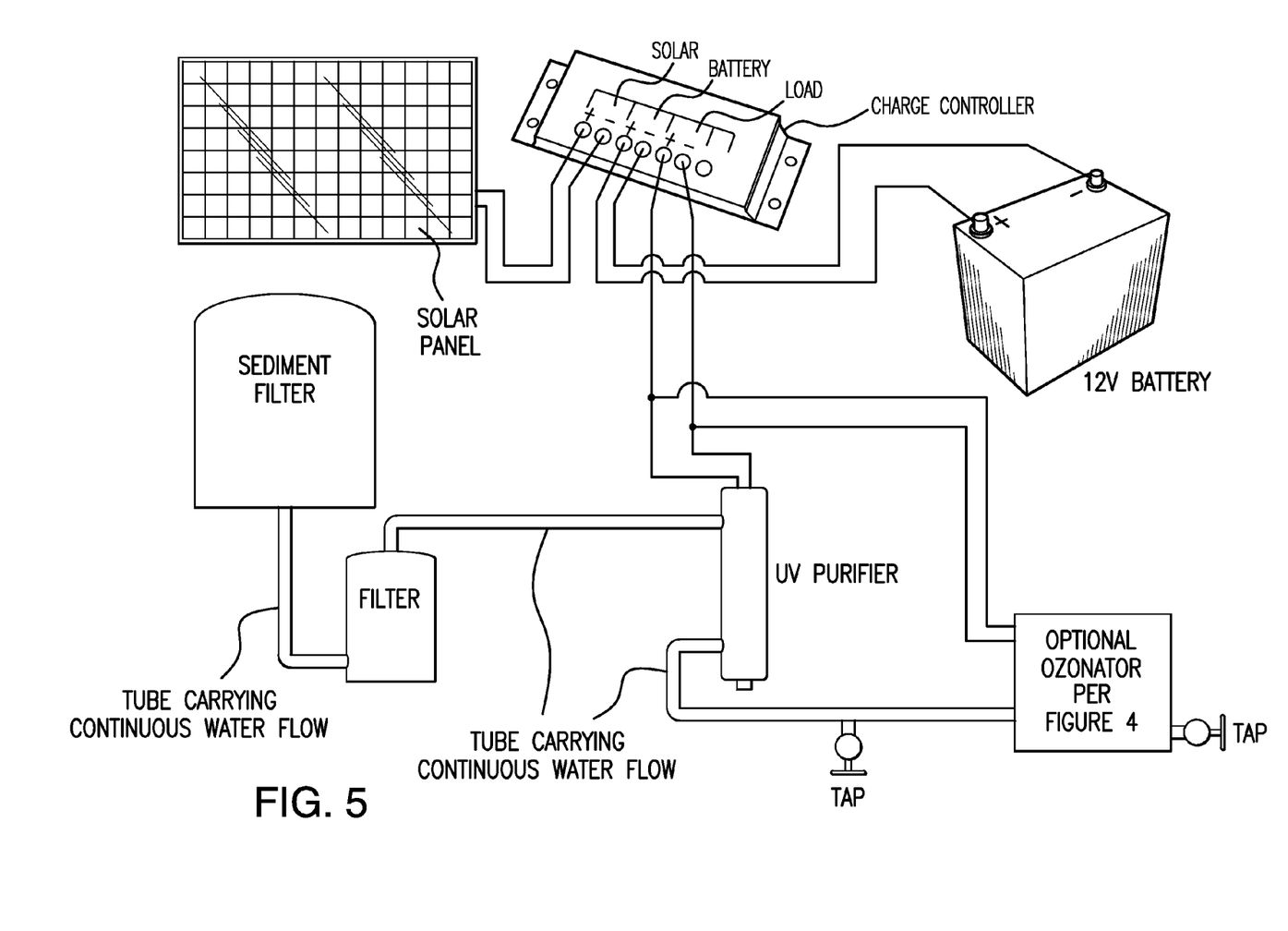
FIG. 5 shows a system having a 50 W solar panel that fits in a suitcase, a charge controller, a battery (which is purchased in the destination country) all electrically connected, a filter system having a sediment filter and finer material filter, connected by a tube to a UV (ultraviolet) purifier, in turn connected to a tap, and optionally connected by a tube to an ozonator such as that shown in FIG. 4 which in turn can run to a tap.
Figure 6:
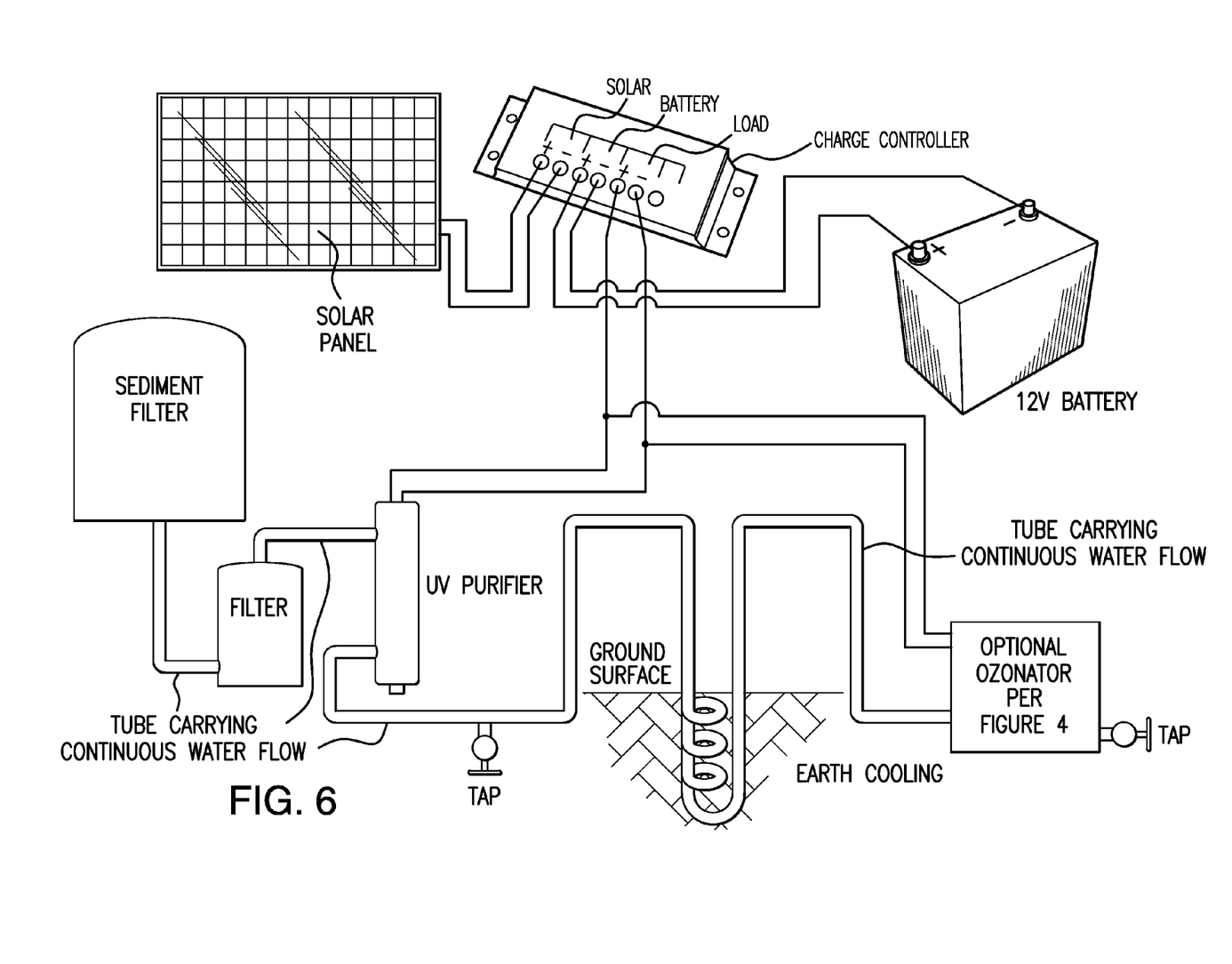
FIG. 6 is like FIG. 5 with the addition of an earth cooling system, in this example drawing a coil of tube connected between the filter system and the UV Purifier.
Figure 7:
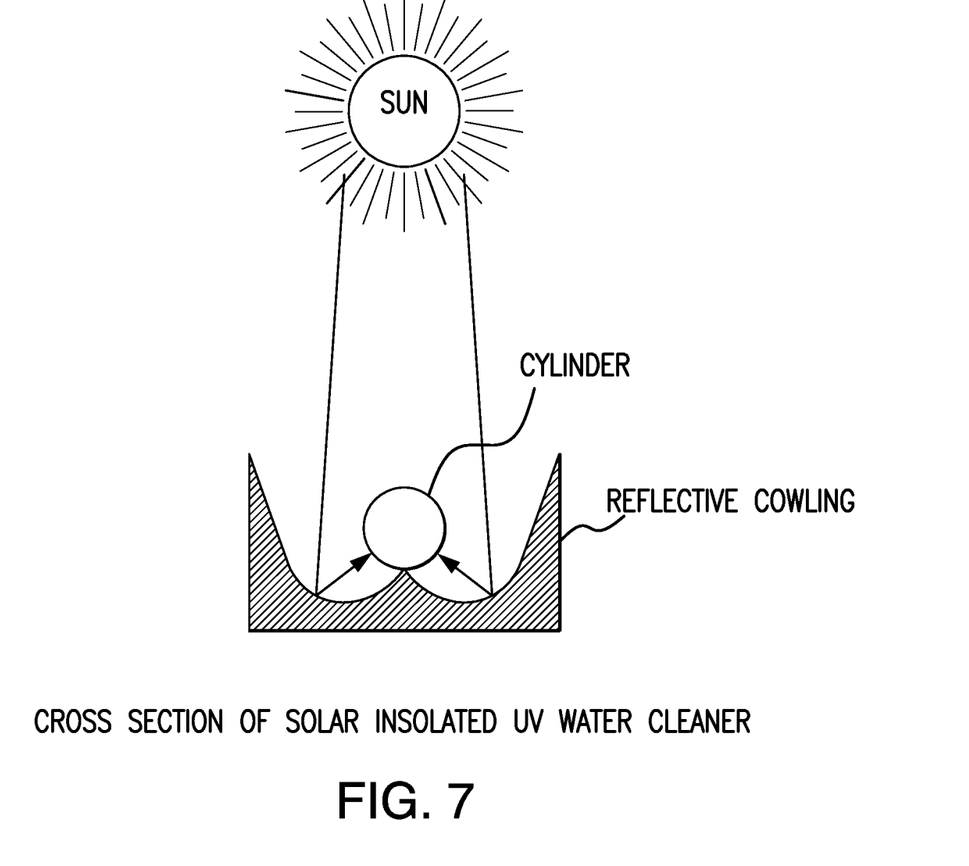
FIG. 7 shows a solar insolated UV water cleaner with a cylinder, and a reflective cowling of a geometric shape such as a cardioid for optimal heating of the rear of the cylinder.

Ozonation is proposed to be done through an ENALY brand Ozonator OZW1 (specification attached as FIG. 4), available on e-Bay. Enaly is located at Room 602, No. 4—Building ZiXin Mansion, 98 Nong BiXiu Road, Minghang District, Shanghai China, 201100 and their Tel/Fax: +86-21-6413-8841.

The ENALY ozonator, the ozonator cleaner, is a plug in device at 110 VAC, but upon examination turns out to have a converter to 12 VDC, so it actually is a 15 W device operating on 12 VDC. The wires to the 110 VAC to 12 VDC transformer converter can be cut off and the 12 VDC output from the solar charge regulator can power the ozonator. Those are desirable voltages for a solar apparatus around water because it eliminates the risk of electrocution except by very deliberate means.

In cold climates the water will be sufficiently cooled that it may not need to be cooled for better ozonation, but ground cooling (or sometimes warming) is a good way to have more steady state ozonation.

Ozonation works best on cool water because the gas dissolves better. The ozonator has a mixer. The purpose of the ozonator is to further kill and purify toxic organisms and oxidize any residual chemicals.

The system has had a gravity feed. The ozonator begins to operate when the tap is opened and only then.

To prepare water for a run through an ozonator, the water runs through a tube running in water in a clay pot cooler described in a moment.

The ozonator uses 15 W or 30 W depending on size and a solar panel powers it during the day and in a fancier system, a battery powers it at night. Ideally, the solar panel(s) are connected through a charge managing device which can also manage a load. The load can be the ozonator. A standard battery for a car has approximately 1200 watt hours, so a 15 W device would in theory run for 80 hours on standard car battery. Under those parameters, if the solar panel has enough excess power generated over the ozonator use, the battery can be kept in a high charge state and the ozonator operated at night, though of course the solar UV cleaning would not occur at night in the UV intensifier.

A 45 W solar panel would be adequate. For installation, a Morningstar® SS-6L charge controller with LVD would give good data information (manufactured by Morningstar Corporation, 1098 Washington Crossing Road, Wash. Crossing, Pa. 18977 USA). When the ozonator is not being used, the battery/charge controller/solar panel can be a community power source. It could power a bulb of low wattage, such as an LED or perhaps CFL light, or a battery charger for light use which would enable the entire apparatus to function as sort of a utility station where water and power can be drawn. Cell phone charging could occur. Further, if the battery is coupled with an inverter, small power tools, such as for battery powered drills, saws and other "cordless appliances" could be charged with a significant potential for productivity enhancement and job creation. Power management is critical to not denude the water system of power, and as more electrical attachment become involved, more education of a user/maintenance person would be needed.

How water is stored after the ozonation is not critical, other than the vessel be clean and remain clean to avoid recontaminating water. It is also important that the person touching the tap have clean hands so the tap handle does not become a vector of disease and contamination.

The two purification stages are useful as various nematodes not known to affect the water supply in the United States or developed countries as often caused untold diarrheal and disease issues, including fatalities in underdeveloped countries.

Rainwater is of course an ideal source for water, and is easy to filter and clean. A gutter collection system or cistern can be integrated with this system to increase its utilization. If water tested after UV radiation is not quite suitable for drinking, it can often be used for bathing or washing, and some cooking where food will be boiled or heated, and only water for drinking and cold cooking needs to pass through the ozonator.

As suggested previously, in cold climates, one would try to use snow or rain, and likely have to use only the UV concentrator and ozonator and the sunlit final storage bottle.

In freezing climates, the preferred mode is to use ozonated water and soap to wash and rinse vessel, heat vessel with boiling water, and melt clean snow and rain over fire in vessel, or use residual heat or solar heat.

In order to enable ozonator to work optimally, two things help:

First, the water should be cooled. The best way to do this in a warm climate is to have it run through nested clay jars in ground shaded with water between the jars and with water in the inside jar. The tubing runs in a coil around the inner jar in the liquid so it cools and the jars stay cool by evaporative cooling. Clean water in jars is best, but the tubing is sealed so that cleanliness makes little difference.

Second, the ozonator preferably needs dry air. This achieved by a tube carrying air from the desiccator. The ENALY ozonator has a dessicator that comes with it described on the attached specification.

Figure 8:
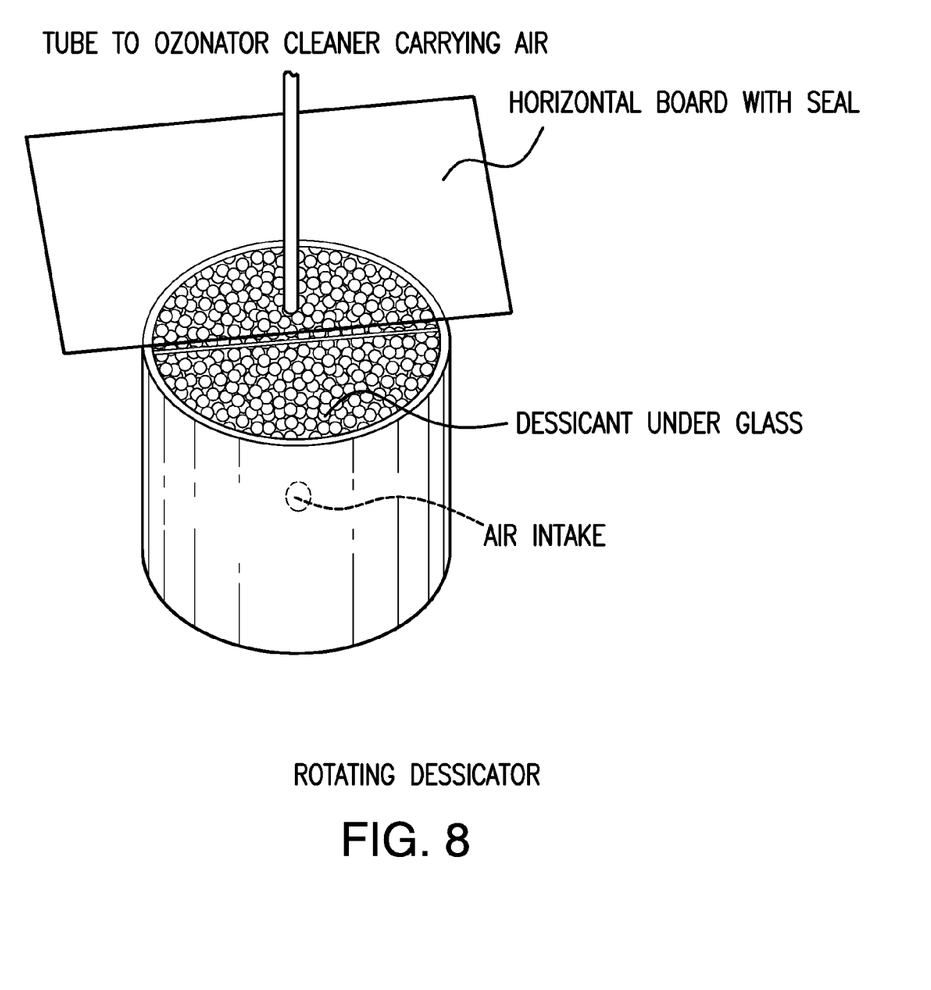

I propose using an ENALY desiccator and a novel desiccator switching device which is mounted vertically under a horizontal board which pivots in front of and behind a solar passive oven. The board has a desiccator on each end. When one desiccator turns purple indicating it is "wet", it is pivoted around and the other solar dried desiccator mates with an intake on the bottom of an intake board immediately above and adjacent to an intake port in the horizontal board. The tube to the ozonator penetrates the upper board. The best system is to have a magnetized top to the air filter with an aperture that mates magnetically with another magnet that has an aperture connected to the tube through the upper board. Alternatively, nylon washers help the seal between the boards which seal should be good, but need not be 100% airtight. The air comes in through the bottom of the desiccator and out the top through the horizontal board and then to the intake board above the horizontal board and through a tube carrying air to the ozonator from the desiccator. The only problem with the ENALY desiccator is that it is plastic, and likely a glass model with a suitable exit port compatible with the tube through the upper board is needed. Otherwise, the sun and UV exposure will degrade the plastic container for the desiccant beads in the desiccator.

This enables dry air to be used to ozonate cooled water for best effect of the ozonator.

Initial Setup and Operation:

For the small to medium size parts, a large board mounted on posts and tilted to prevent sunlight from shining on the rear, except for any parts on which sunlight is desired, can work well. The solar panel can be on the front facing the sun and tilted to a favorable angle, and the rest of the parts can be mounted on the back.

Some attention at the time of setup can improve the system significantly. For instance, the filtering material may be fairly dirty to start. It is not desirable to kill all bacteria in the biofilter, but if the bad outweighs the good, the system may need to be primed with a halogenic cleanser of iodine or chlorine compound. Clean water should be used to prime the system and then testing can determine if enhancements are needed at any stage. Enhancements may be restricting ozonator flow, or recirculating ozonated water, multiplying the UV stage, or increasing the filtration surfaces.

Generally, water should not be drained from the bottom for the next stage as contaminants are often attached chemically or physically to objects or silted material that goes to the bottom, so usually water is best decanted from below the surface but well above the bottom.

Other Variations:

For chemical contamination, a difficult problem is presented. For instance, arsenic is toxic. Less toxic perhaps than bacterially contaminated water, but definitely a substance that needs to be eliminated or minimized long-term. For a primitive system, arsenic can be ionically captured through iron oxide. A possible solution is to simply have a stage where water sits in a settling jar with a pile of rusty nails. The effectiveness would have to be gauged, but some removal would occur. The difficulty is that a sophisticated arsenic removal system might simply put the system out of reasonable cost, and no system is worse than a mildly arsenic contaminated system. Limestone gravel can be used to be available to diminish certain toxic substances.

Thus, a variation which would depend on the results of the water test would be to have a stage in which a particular contaminant is ameliorated by use of a substitution or replacement reaction for an organic contaminant, or by an ionic replacement reaction for a metal contaminant. These special reactions would be to remove contaminants not normally destroyed by UV, and further be designed to remove substances not typically destroyed by electron shell reactions. Bacteria are normally destroyed in developed countries by chlorination, or as proposed here, ozonation, because the free electrons have such a high propensity to covalent bonding with organic compounds that the bacterial membrane is destroyed and the cell is destroyed by apoptotic or necrotic cascade.

Some metals can be precipitated out to a virtually insoluble precipitate which could be hand cleaned out of a clear settling jar. The key for any specialized chemical treatment stage is to attempt to use a low cost, low maintenance mechanism that focuses on improvement, not necessarily perfection. Also, if the chemical treatment stage is not maintained, the consequence has to be evaluated. Potassium alum is a well-known and very effective settling agent, but it has to be resupplied and requires community discipline for steady use and effectiveness.

It should be possible to have a soap dispenser or to have a drip Clorox® (TM of Chlorox Corporation) sodium hypochlorite dispenser be near the tap handle so the user who has just carried impure water for a long way can wash their container with clean water and soap and then use the container for local use in climates where water is scarce or has to be carried. Further, the tap has to be a vector for transmission of disease from water carrier to water carrier. Also, if not soap contaminated, it would be possible to recirculate the Clorox-washed water into the system at the beginning stage.

Some of the more complex parts used were purchased at the following companies. The companies, once the goal was explained, often gave substantial discounts.

Filters and housings are available in many sizes at Liquatec, P.O. Box 2637, Chino Hills, Calif. 91709.

A Sunsaver® photovoltaic system controller SS-10L-12V for controlling battery charge and transmitting solar panel voltage for charging and enabling loads on electric system is available from Morningstar Corporation, 1098 Washington Crossing Rd., Wash. Crossing, Pa. 18977.

Housings for filters are available as Culligan® water filters in many sizes from Culligan International Company, Northbrook, Ill. 60062.

Sediment can be further removed by spindown filters, with or without screen mesh, prior to smaller diameter filters. Part No. ¾-100-f by Rusco Corporation, 13360 Chambord St., Brooksville, Fla. 34613 is a good source.

The UV purification system selected was from Freshwater Systems, Inc., 85 commerce Center, Greenville, S.C. 29615. There are UV purification systems available which are adaptable to 12V applications. A Sterilight 6 gallons per minute Model S5Q-PA (12 VDC) is a good selection.

Some pressure is needed to move the water through all the filters. A low voltage pump and additional energy could be used, or simply have more elevation between the input and the output through the filters. The low pressure had the advantage of lower flow rates and more purification, but of course some flow is needed for practical reasons.

To make the initial filter more biologically active, yeast, particularly brewer's yeast, can be used which is available in most stores where bread is sold or made.

The invention is not meant to be limited to the disclosures, including best mode of invention herein, and contemplates all equivalents to the invention and similar embodiments to the invention. There are a number of combinations of the principles which are useful to accomplish the particular water quality objectives based on the resources, climate, season, water sources, temperature and insolation for a particular community.

I claim:

1. A system to improve the cleanliness of water comprising:
   at least one suitcase portable energy source;
   said at least one suitcase portable energy source being assistable by a batter connected to said portable energy source through a charge controller;
   at least on ultraviolet water cleaner transportable in a suitcase;
   at least one of said at least one ultraviolet water cleaners being powered by said at least one suitcase portable energy source;
   at least one filter system to clarify the water to enable ultraviolet energy to impact impurities in said water;
   said system to improve the cleanliness of water being connectable to an ozonator cleaner to improve its drinking quality;
   said at least one ultraviolet water cleaner being connected to allow continuous water flow from said at least one filter system to said at least one ultraviolet water cleaner;
   said system to improve the cleanliness of water being capable of being used as a small community electric and lighting center;
   an ozonator cleaner;
   at least one earth cooling system for increasing the cleaning efficiency of at least one of said at least one ultraviolet water cleaner and said at least one ozonator cleaner, said at least one earth cooling system being disposed to cool continuous water flow from said at least one filter system to at least said ozonator cleaner in at least one connector tube fluidly connected between said at least one filter system and said at least one ozonator cleaner, through which at least at least one earth cooling system is disposed a portion of at least one of said at least one connector tubes carrying continuous water flow.

2. The system to improve the cleanliness of water according to claim 1, further comprising:
   at least one of said at least one ultraviolet water cleaners being heated by solar insolation;
   said at least one ultraviolet water cleaner having at least a cylinder to be heated by said solar insolation;
   said cylinder having a longitudinal axis;
   said cylinder being partially surrounded by a reflecting surface approximately parallel to said longitudinal axis;
   said reflecting surface being a shaped geometric cowling to reflect light onto said cylinder;
   said cylinder having a sunward portion, and said cylinder having a rearward portion shaded by said sunward portion of said cylinder from surface insolation;
   said reflecting surface being a shaped geometric cowling and said cylinder being disposed in said at least one ultraviolet water cleaner so that said reflecting surface casts reflected insolation onto said rearward portion of said cylinder, and said cylinder and said reflecting surface being able to be positioned to enable said reflecting surface to reflect insolation onto the entire said rearward portion of said cylinder when the sun is at solar noon and is at 90 degrees to said longitudinal axis.

3. The system to improve the cleanliness of water according to claim 1, further comprising:
   a tube to said ozonator cleaner carrying air being cooled by said at least one of said earth cooling systems.

4. The system to improve the cleanliness of water according to claim 1, further comprising:
   at least one of said earth cooling systems having two vessels set upright, one within the other and having a layer of water between a portion of each vessel, through which portion runs a portion of said tube carrying continuous water flow, said portion of said tube carrying continuous water flow to be cooled by evaporative cooling.

5. The system to improve the cleanliness of water according to claim 4, further comprising:
   said at least one filter system having at least two successive stages;
   said first stage of said at least one filter system filtering materials less fine than a grain of sand; and
   said second stage of said at least one filter system filtering materials to enable cleansing of said water by said cleaners.

6. The system to improve the cleanliness of water according to claim 5, further comprising:
   a rotating dessicator having at least two chambers, one of which at a time is alternately connected sealingly to said ozonator cleaner by said tube to said ozonator cleaner carrying air;
   said one of each at least two chambers being disposed sealingly to said tube to said ozonator cleaner carrying air to enable a desiccant material in said rotating dessicator to be utilized in order to alternately dry said desiccant material by heating it, and after rotating said dessicator, to pass air through said desiccant material into said tube to said ozonator cleaner carrying air so that air of lesser humidity can enter the ozonator cleaner.

\* \* \* \* \*